US008675536B2

(12) United States Patent
Beser (10) Patent No.: US 8,675,536 B2
(45) Date of Patent: Mar. 18, 2014

(54) CUSTOMER FACING INTERFACE POWER CYCLING OF WIRELESS TERMINALS

(71) Applicant: Telsima Corporation, Santa Clara, CA (US)

(72) Inventor: Nurettin Burcak Beser, Sunnyvale, CA (US)

(73) Assignee: Telsima Corporation, Santa Clara, CA (US)

( * ) Notice: Subject to any disclaimer, the term of this patent is extended or adjusted under 35 U.S.C. 154(b) by 0 days.

(21) Appl. No.: 13/660,924

(22) Filed: Oct. 25, 2012

(65) Prior Publication Data

US 2013/0094346 A1   Apr. 18, 2013

Related U.S. Application Data

(62) Division of application No. 11/748,443, filed on May 14, 2007.

(60) Provisional application No. 60/747,162, filed on May 12, 2006.

(51) Int. Cl.
*G08C 17/00*   (2006.01)

(52) U.S. Cl.
USPC ............ 370/311; 370/328; 455/436; 455/522

(58) Field of Classification Search
None
See application file for complete search history.

(56) References Cited

U.S. PATENT DOCUMENTS

| 5,423,065 | A  |    | 6/1995  | Pinard |
| 5,940,743 | A  | *  | 8/1999  | Sunay et al. .................... 455/69 |
| 6,055,427 | A  |    | 4/2000  | Ojaniemi |
| 6,169,907 | B1 | *  | 1/2001  | Chang et al. ................... 455/522 |
| 6,438,116 | B1 | *  | 8/2002  | Corbett .......................... 370/331 |
| 6,647,001 | B1 | *  | 11/2003 | Bhagavath et al. ........... 370/331 |
| 6,721,872 | B1 |    | 4/2004  | Dunlop et al. |
| 6,757,270 | B1 |    | 6/2004  | Kumar et al. |
| 6,950,657 | B1 |    | 9/2005  | Hiller et al. |
| 6,996,076 | B1 | *  | 2/2006  | Forbes et al. ................. 370/310 |
| 7,031,711 | B2 |    | 4/2006  | Soliman |
| 8,286,017 | B2 |    | 10/2012 | Lo |
| 2002/0187777 | A1 | * | 12/2002 | Osterhout et al. ............ 455/417 |

(Continued)

OTHER PUBLICATIONS

International Search Report issued Jan. 4, 2008 in corresponding International Application No. PCT/US2007/011661.

(Continued)

*Primary Examiner* — Chi Pham
*Assistant Examiner* — Mohammad Adhami
(74) *Attorney, Agent, or Firm* — Sheppard, Mullin, Richter & Hampton LLP (57) ABSTRACT

Systems and methods are described for configuring customer premises equipment in a wireless network in response to reconnection of subscriber station to a base station. A set of rules is provided that governs configuration of a network interface based in part on whether the interface connects to a different base station after reconnection. Reconfiguration may include cycling power of the network interface and the decision to cycle power may be based on network configuration determined after the loss of communication. This decision can be made after the loss of communication and after the network interface is reconnected to the wireless network through the same or a different base station. The rules may be processed by a combination of subscriber equipment, network interface and base station. Power may be cycled responsive to a message transmitted by the one base station to the network interface.

10 Claims, 4 Drawing Sheets

(56) References Cited

U.S. PATENT DOCUMENTS

| | | |
|---|---|---|
| 2003/0078037 A1 | 4/2003 | Auckland et al. |
| 2005/0025132 A1 | 2/2005 | Harper et al. |
| 2005/0037758 A1 | 2/2005 | Rimoni |
| 2005/0047429 A1 | 3/2005 | Koo et al. |
| 2005/0048969 A1 | 3/2005 | Shaheen et al. |
| 2006/0126661 A1 | 6/2006 | Zheng et al. |
| 2007/0190950 A1 | 8/2007 | Madhavan et al. |
| 2010/0232392 A1* | 9/2010 | Han et al. ............... 370/331 |

OTHER PUBLICATIONS

Written Opinion issued Jan. 15, 2008 in corresponding International Application No. PCT/US2007/011661.

* cited by examiner

CUSTOMER FACING INTERFACE POWER CYCLING OF WIRELESS TERMINALS

CROSS-REFERENCE TO RELATED APPLICATIONS

This application is a divisional application of U.S. Ser. No. 11/748,443, filed May 14, 2007, entitled "CUSTOMER FACING INTERFACE POWER CYCLING OF WIRELESS TERMINALS," which claims priority to U.S. Ser. No. 60/747,162, filed May 12, 2006, entitled "CUSTOMER FACING INTERFACE POWER CYCLING OF WIRELESS TERMINALS," both of which are incorporated by reference.

BACKGROUND OF THE INVENTION

1. Field of the Invention

The present invention relates generally to wireless terminals and more particularly to the mobility of addressing in wireless networks.

2. Description of Related Art

Wireless Broadband Access ("WBA") based systems have been designed to have operational characteristics that are indistinguishable from Cable or DSL methods of broadband access from the viewpoint of the customer. However, wireless systems are subject to network termination specific substantial signal fading and have the ability to connect using multiple network termination points. In many systems, customer premises equipment ("CPE"), including personal computers ("PCs"), may experience multiple disconnects and reconnects among various different base stations.

Wireless systems may be viewed as multiple logical modems connected through different Network Termination points via different virtual cables, where the system is able to pick the best signal strength at the time that it is connected to an end-point. As time passes, fading on the virtual cable causes the logical modem to disconnect from its current base station and the subscriber station directs the modem to reconnect based on best available signal strength. This behavior can be repeated many times. Fading may be apparently random or based on predictable patterns.

CPE response to fading and disconnect is generally dependent on the type of base station to which it connects. For a Routed base station, the IP address of the CPE changes to enable routing of packets to the CPE through the new subnet. The easiest method to force a CPE to seek a new IP address is to power cycle the CPE facing network interface whenever the subscriber station connects to a different base station. However, the change of IP address is disruptive causing shutdown all network connections in use by application in the CPE. Active connections, whether IP streaming or download in progress, have to be terminated and re-started using the newly-obtained IP address. Also, in many business uses, connections are made from the Internet to the CPE as well from the CPE to the Internet. For these connections, the CPE IP address must be advertised when changed. Even when Dynamic DNS method is being used the DNS update is a slow process and takes hours and sometimes days to spread out in the Internet.

For bridged base stations, the connection between original and new base stations is important. If the base stations are not in the same layer-2 network then the problems described for the routed BS will be observed. If the two base stations are within the same layer-2 network, the CPE does not have to change its IP address and will only experience a brief period of packet drop of seconds. However, a new set of network topology problems will be observed. For example, any broadcast packet will be repeated over all connected base stations, potentially causing a broadcast storm. Malicious users could use broadcast storms to run theft of service and denial of service attacks. Furthermore, identification and debugging of network problems is made difficult. The use of Dynamic VLANs may solve broadcast storm issues and may provide some IP address mobility. However, the initial IP address and VLAN assignment process can cause random distribution of IP addresses, resulting in an expanded and sometimes uncontrollable broadcast domain.

BRIEF SUMMARY OF THE INVENTION

Certain embodiments of the invention enable the provision of enhanced service in wireless networks independent of subscriber station and CPE configuration and consistent with the characteristics of wired ADSL or cable network services. Accordingly, inherent differences between wireless and wired network designs are accommodated. These differences include the effects of unpredictable fading that can occur in wireless networks and which can cause a subscriber station to occasionally disconnect from one base station and reconnect to a different base station. Thus, in some embodiments, methods for controlling power cycling of CPE network interfaces are employed to minimize disconnection events.

In certain embodiments, subscriber station equipment is configured to maintain power cycle rules and to use these rules to make decisions related to network configuration after a power cycle. In some embodiments, the subscriber station equipment may decide to defer network reconfiguration pending initialization and contact of CPE equipment. In certain embodiments, the subscriber station equipment may defer network configuration when signal strength of identified base stations is weak or comparable to other base station signals.

In certain embodiments, base stations may direct network reconfiguration. Base stations typically direct network reconfiguration when network topography and base station characteristics unknown to the subscriber station would affect power cycle decision making Base stations may disseminate power cycle rules to connected subscriber stations during normal operation or during connection negotiation. In certain embodiments, subscriber station interfaces, CPE or some combination of subscriber station interface, CPE equipment and base station may determine power cycle rules.

BRIEF DESCRIPTION OF THE DRAWINGS

The structural and functional aspects of the invention will become understood by those skilled in the art by reference to the following detailed description when taken in conjunction with the appended drawings, in which.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the invention enable the provision of enhanced service in wireless networks independent of subscriber station and CPE configuration. Certain embodiments enable the provision of wireless broadband access service that appears to have the same characteristics as wired ADSL or cable network services and inherent differences between wireless and wired network designs are accommodated and concealed as appropriate. Certain embodiments of the invention address differences between wired and wireless services, including the effects of unpredictable fading that can cause subscriber stations to occasionally disconnect from one base station and reconnect to a different base station.

Figure 1:
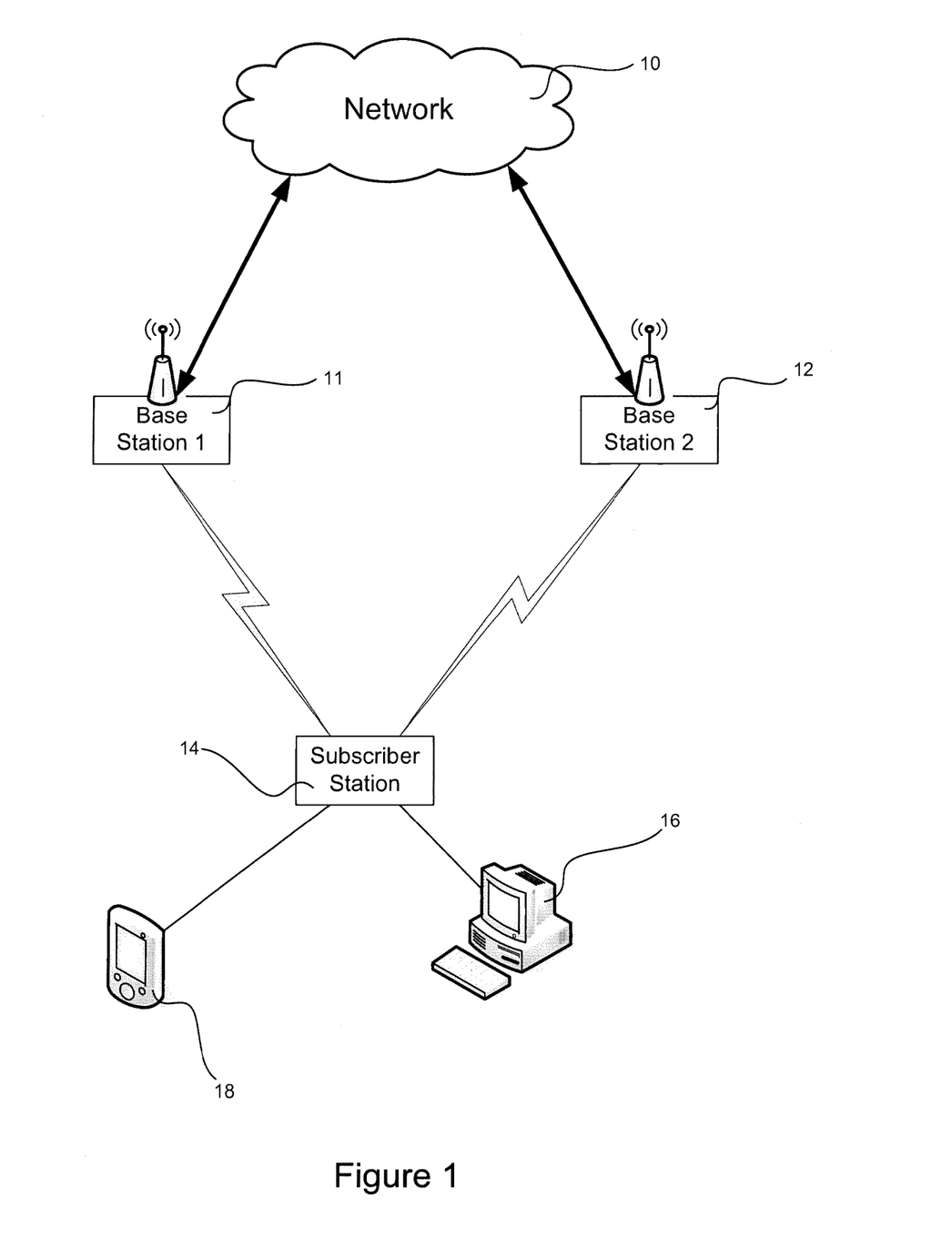
FIG. 1 illustrates a simple example of a wireless network.
Figure 2:
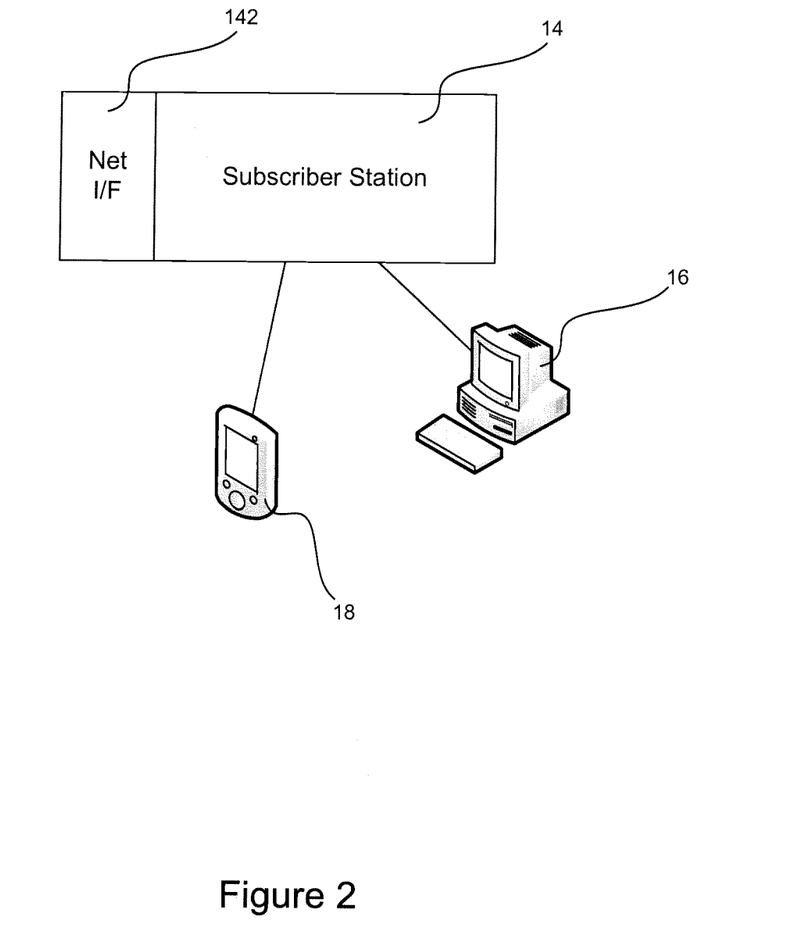
FIG. 2 depicts the configuration of a subscriber station.

Referring to FIGS. 1 and 2, in some wireless networks, it may be desirable to reconfigure network interfaces when a wirelessly connected equipment 18 or 16 is disconnected from one base station 11 and reconnected to another base station 12. The desirability or necessity of reconfiguration is typically determined by the nature of the base stations 11 and 12 and the network 10 to which a subscriber station 14 is connected. Reconfiguration of a subscriber station interface 142 is often achieved by cycling power to the subscriber station interface 142, causing interface reset and forcing reacquisition of network configuration data. This power down of the subscriber station interface 142 can sever all network connections of any CPE (e.g., 16 or 18) using the subscriber station interface 142. Severance of network connection may affect computing systems 16 or 18 and applications running on computing systems 16 or 18. Therefore, disconnection of CPE 16 or 18 may lead to inconsistent or non-uniform subscriber system function. Consequently, in certain embodiments, decisions to cycle power of subscriber system interfaces can be made by a combination of subscriber station, CPE and base station in accordance with certain predetermined rules.

In certain networks, network interface reconfiguration may be achieved without cycling power to the interface. Thus, certain embodiments of the invention reconfigure network interfaces through networking protocols, software, hardware and any combination of these methods deemed appropriate. For example, certain subscriber equipment may process a received protocol-specified command to perform a reset, reconfiguration or power cycle of the network interface by issuing a software command to its network interface. The subscriber equipment may also assert a hardware signal to cause reset of selected network interface components. For the purposes of this description, power cycling is intended to encompass all combinations of network interface reconfiguration and different embodiments may selectively use software or hardware methods as appropriate.

In certain embodiments, disconnection may be detected apart from the subscriber system interface 142. For example, disconnection may be detected after reconnection based on incorrectly addressed data. In one example, a reconnected subscriber computer 16 may transmit a data packet to a server using an incorrect gateway address. In certain embodiments, components can be provided, typically in a base station 10 and 12 to intercept incorrectly addressed data packets. In certain embodiments, a base station may subsequently transmit a message causing the subscriber interface 14 to cycle power.

In certain embodiments, power cycling decisions include decisions to cycle power of a customer facing interface, decisions to refrain from cycling power and deferral of decisions on power cycling. In some instances, power cycling decisions can be deferred until reconnection of a subscriber station 14, completion of subscriber station 14 registration or until certain predetermined conditions are met. Decision deferral may permit system connectivity to survive temporary disruptions in wireless service and transitory signal fading. When it is determined that connectivity between subscriber stations and base stations is lost, a subscriber station can be directed to reset its network interface.

For example, if a subscriber station 14 is connected to the same base station 11 or 12 before and after reconnection, the subscriber station typically will not require power cycling. However, if the subscriber station 14 connects to a different base station 12 or 11 after reconnection, the subscriber station 14 may be required to cycle power in its network interface 142. Thus, deferral of a decision until reestablishment of the connection between subscriber station 142 and base station 11 or 12 can be desirable because network connections may be preserved through the disconnection period. In at least some embodiments, decisions can be deferred even when reconnection to a different base station 12 or 11 occurs. For example, after reconnection of a subscriber station 14 to a different base station 12 or 11, it may be advantageous to defer power cycling if the connection to the different base station 12 or 11 is weak or if significant fading is present. The subscriber station interface 142 may seek a stronger signal from a different base station (e.g. 11, 12 or other base station, not shown in the drawing) or may be reconnected to the original base station 11 or 12. In either of these cases, it could be advantageous to defer the power cycling decision.

Figure 3:
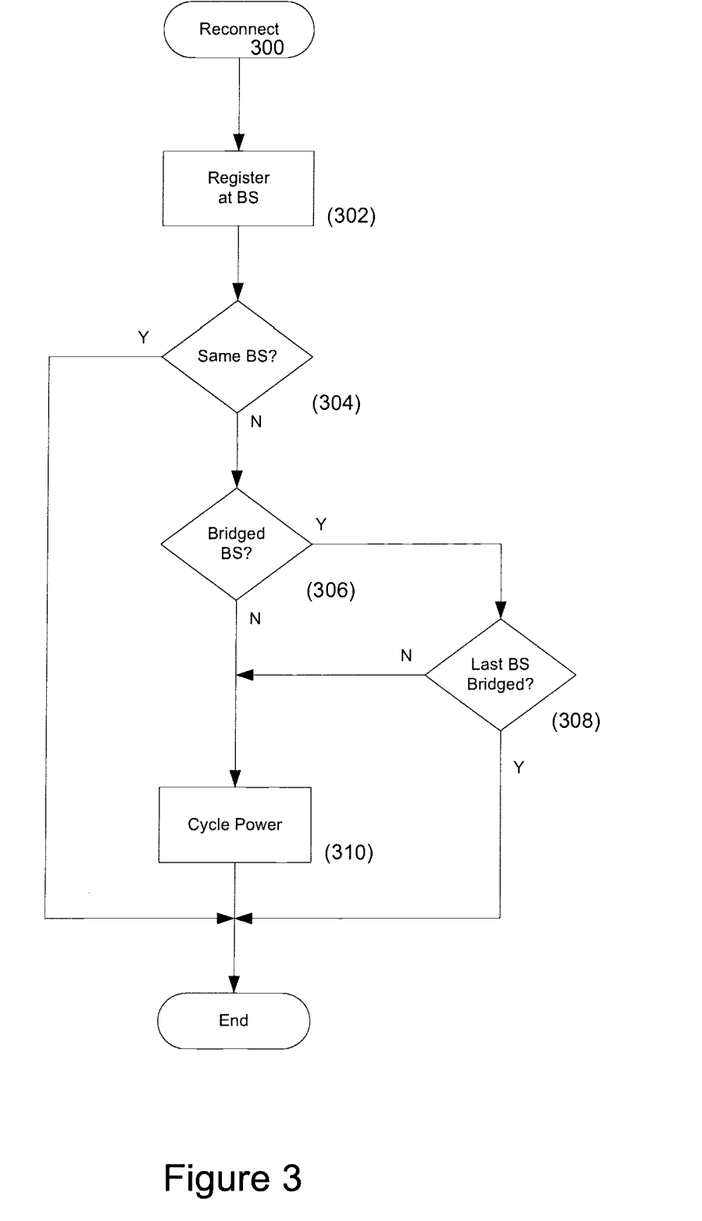
FIG. 3 is a flowchart describing one example of power cycle decision making.

FIG. 3 illustrates a simplified decision-making process. In certain embodiments, a decision may be deferred until reestablishment of subscriber station 14 to base station 11 or 12 connection based on the type of network 10 to which the subscriber station 14 is to be connected. Thus, at step 302, the subscriber station 14 connects to and registers with a base station 11 or 12. The subscriber station 14 may choose a connection to one of a plurality of base stations 11 or 12 based on factors including signal strength, base station 11 or 12 type, availability of connections between base station 11 or 12 and network 10 and availability of the previous base station 11 or 12 to which the subscriber station 14 was connected. At step 304, then, if a connection is reestablished between subscriber station 14 and the previous base station 11 or 12, then power recycling may not be required. However, it should be appreciated that the existence or absence of other factors may cause the recycling of power. For example, if significant time has elapsed between disconnection and reconnection of base station 11 or 12 and subscriber station 14, network connections may be lost and power may be recycled.

In certain embodiments, the subscriber station 14 may reconnect to a different base station 12 or 11. Furthermore, in at least some embodiments, the subscriber station 14 may connect to different types or configurations of base station 12 or 11 or network 10 before and after connection reestablishment. A power cycle may be required if different network types are observed before and after reconnection. A power cycle may be initiated if the same network types are observed before and after reconnection but for other reasons, the network interface 142 can not be reconfigured without a reset. In certain embodiments, power cycle may be unnecessary if the network types before and after reconnection support dynamic reconfiguration of the network interface.

Furthermore, in certain embodiments, subscriber equipment 16 and 18 may determine whether power cycle is required. Detection by subscriber equipment 16 and 18 may be provided by configuration, reprogramming or addition of hardware and software components. In certain embodiments, existing detection capabilities may be employed and/or augmented. For example, in an IEEE 802.11 network, defined procedures for detecting loss of network connection may be used. In another example, subscriber equipment 16 and 18 may include applications and operating system components that cooperate to detect loss of network connection between device 16 and 18 or applications executed by device 16 and 18. Consequently, in many embodiments, both subscriber station 14 and subscriber equipment 16 and 18 may contribute to the decision-making process.

Continuing with the example provided in FIG. 3, one factor that may prompt power cycling relates to network topography. As illustrated, a change of base station 12 or 11 detected at step 304 and detection at step 306 that the new base station 12 or 11 is a routed base station may result in power cycling at step 310. In another example, if the new base station 12 or 11 is detected at step 306 to be a bridged station and the prior connection is determined at step 308 to have been made to a bridged base station 11 or 12, then power cycling may not be required. However, if it is determined that the reconnection involves connection of a previously routed base station to a bridged base station (at steps 306 and 308), then power cycling at step 310 is typically indicated.

Figure 4:
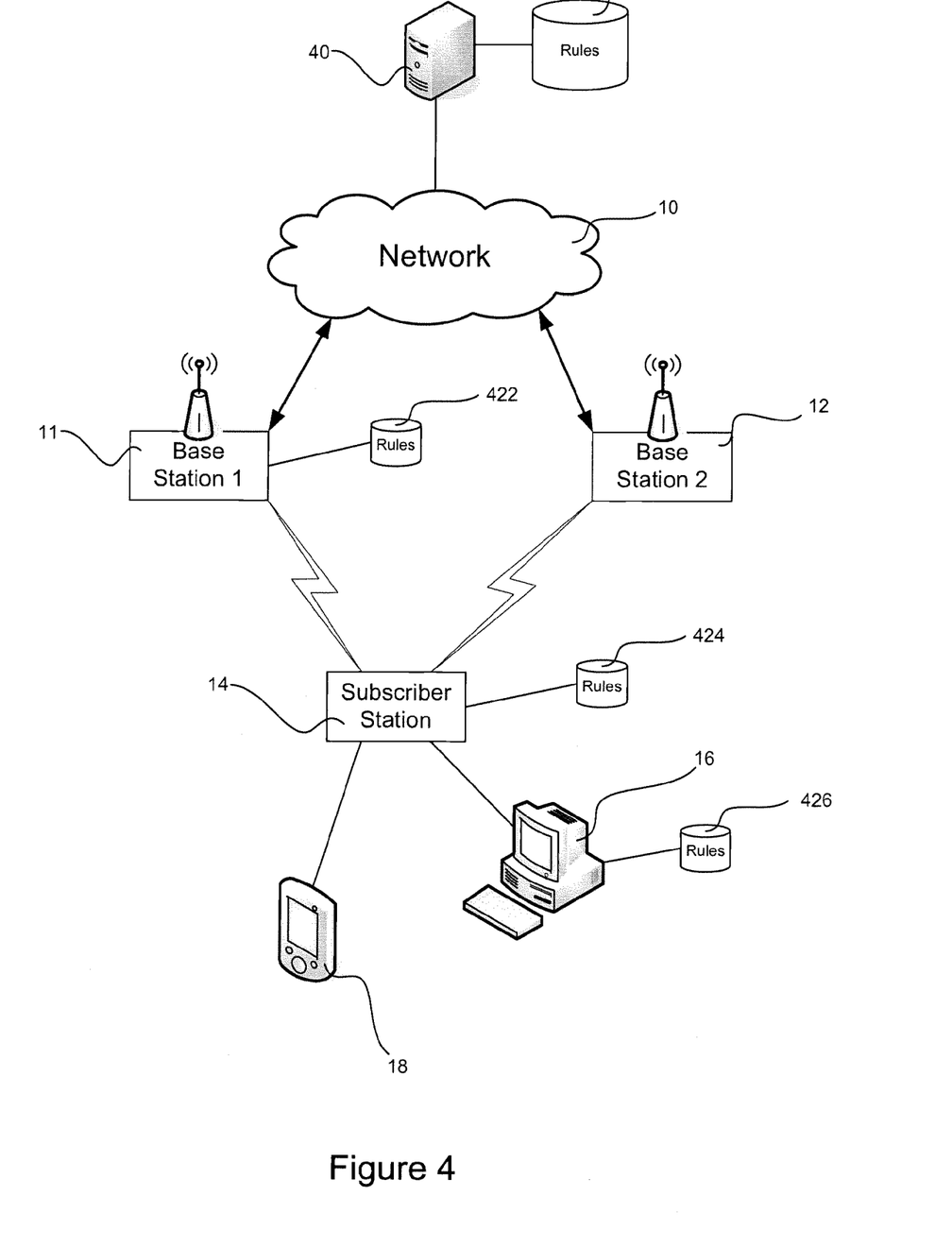
FIG. 4 illustrates a system according to aspects of the invention.

FIG. 4 illustrates a system according to certain aspects of the invention. In certain embodiments, a set of rules 420 can be defined to direct power cycle decision making The rules 420 typically provide parameters that guide decision-making and identify whether power cycle is controlled by the subscriber station 14 or base station 11 or 12. The set of rules may be maintained at a network server 40, separately or as a copy 422 at one or more base stations 11, separately or as a copy 424 in the subscriber station and separately or as a copy 426 by certain subscriber equipment 16. In certain embodiments, some combination of these rules 420, 422, 424 and 426 may be maintained. In some embodiments, at least a portion of the rule sets 420, 422, 424 and 426 may be shared between components of the system and portions of the rule sets 420, 422, 424 and 426 may be propagated and maintained by a server 40 or other suitable device. For example, a set of rules 424 maintained in the subscriber station 14 may be distributed and/or maintained by a base station 11 or 12 and, based on system requirements, periodic updates may be made to ensure synchronization of sets of rules 420, 422, 424 and 426. Likewise, a central server 40 may periodically update the rules 422 maintained at a base station or in a subscriber station 424.

In certain embodiments, power cycle decisions may be made by components provided in a base station 11 or 12. Components can be a combination of hardware and software and can be provided based on factors including nature of the base station 11 or 12, nature of subscriber station equipment 14, rules disseminated by a provider and subscriber preferences. In one example, a subscriber station 14 may include network interfaces 142 that are configured to connect automatically without intervention or direction of subscriber computer equipment 16 or 18 based on predetermined rules or configurable subscriber station rules 422. In the example, the network interface 142 may include modems, routers and bridges. The network equipment 14 and 16 may be configured to load connection parameters including power cycle rules 426 such that, upon power-up, the power cycle rules 426 can determine whether previously established network connections should be maintained, whether all connections should be abandoned and the disposition of network configuration including addresses and operating modes. In another example, the power cycle rules 420, 422, 424 and 426 may dictate that initialization of the network interfaces 142 be deferred until CPE computer equipment 16 and 18 is connected to the interfaces 142.

In certain embodiments a power cycle decision can be communicated by a base station 11 or 12 to the subscriber station using a message such as a broadcast message. This message may be transmitted as part of a registration response to the subscriber station 14 and may cause the subscriber station 14 to cycle its interface or reset its interface configuration. Decision making by the base station 11 or 12 can include direct commands issued by the base station 11 or 12 to the CPE 14, 16 and 18 or directly to components such as the subscriber station interface 142.

In certain embodiments, base stations 11 and 12 provide rules to guide and control decision making by the subscriber station 14. In some network configurations, the base station 11 and 12 may be best situated to determine rules governing subscriber station 14 power cycling decisions. The base station 11 and 12 can typically maintain information regarding network infrastructure in its coverage area and can generate or distribute statistically-based rules to guide subscriber station power cycling. For example, in some areas, power cycling may be required in most reconnection cases because it may be statistically more efficient to always cycle power to subscriber station interface 142 upon disconnection or reconnection.

In certain embodiments, network topography known to the base station 11 and 12 can be determinative of whether power should be cycled at a subscriber station interface 142. When a subscriber station 14 is connected to a routed base station 11 or 12, the subscriber station 14 may be required to cycle power in its subscriber station interface 142 upon connection to a different base station 12 or 11 whether the different base station 12 or 11 is routed or bridged. However, a subscriber station 14 that is connected to a bridged base station, should not necessarily cycle power in its subscriber station interface 142 upon connection to another bridged base station. A corollary of this rule may require the bridged bridge station to use a vendor specific Type, Length and Value (TLV) to declare itself as bridged base station and, upon reception of this TLV, the subscriber station must not power cycle its subscriber station interface.

Variations in these rule examples are contemplated. Even though these rules provide for proper operation of subscriber stations 14 when connected to bridged and routed base stations, other network configurations and operational requirements may dictate the use of different rules to obtain a desired level of system functionality. However, certain implications are typically considered when generating rules. For example, a subscriber station 14 will typically function properly in all networks if it cycles power at its interface 142 whenever it loses base station 11 or 12 connectivity because the power cycle typically forces connected CPE (e.g. 14, 16 and 18) to perform a DHCP operation. However, if a subscriber station 14 ordinarily operates in a bridged network and is not configured to cycle power at its interface, certain CPE (e.g. 16 and 18) connected to the subscriber station 14 typically will not function properly when the subscriber station 14 reconnects to a routed base station. When no power cycling of a subscriber interface 142 occurs, the CPE 16 and 18 is not forced to perform a DHCP operation. Similarly, some CPE 16 or 18 may not be configured to detect or react to an indication that the subscriber station 14 has cycled interface power and a DHCP operation will not be performed.

In certain embodiments, a subscriber station interface 142 may be capable of reconfiguring its network settings to different degrees. Thus, a subscriber station interface 142 may support a controlled reconfiguration of its network configuration such that certain network configuration information may be individually selected for reset or reconfiguration. In one example, a change in DNS server or the identity of a gateway device could be changed without causing applications to disconnect from peer or server applications. In this regard, certain embodiments utilize the configuration of the base station at which the network entry was made, or the base station at which a VLAN tag was loaded through a database located somewhere inside the network. Typically, in these embodiments, entry of information can be made in a layer-2 network where IP mobility is desired, and in many embodiments, the IP addresses will be initially assigned.

In certain embodiments, an architecture is employed that includes configuration methods and a plurality of optional components, features and capabilities. The optional components typically include debugging and maintenance tools that ease management of layer-2 networks that are otherwise difficult to maintain and debug due to their inherently flat topography. Debugging and maintenance tools may be configured and operated using customized configuration methods and interfaces. In many embodiments, the architecture may be implemented from combinations of existing network equipment.

Additional Descriptions of Certain Aspects of the Invention

Certain embodiments provide a method for configuring customer premises equipment in a wireless network, comprising providing a set of rules governing configuration of communication between a network interface and one of a plurality of base stations, wherein the one base station connects the network interface to the wireless network, selectively cycling power to the network interface in response to a loss of communication between the network interface and the one base station, wherein a decision to cycle the power is based on network configuration determined after the loss of communication. In some of these embodiments, the decision is made after the loss of communication and after the network interface is reconnected to the wireless network. In some of these embodiments, power is cycled after the loss of communication and after the network interface is reconnected to the wireless network through a different base station. In some of these embodiments, the decision is deferred until a signal from one of the one or more base stations has a predetermined minimum strength. In some of these embodiments, power is cycled after the loss of communication if the network interface is reconnected to the wireless network through a different base station. In some of these embodiments, power is cycled after the loss of communication if the network interface is connected to a different wireless network. In some of these embodiments, power is cycled after the loss of communication if the network interface is connected to a different wireless network. In some of these embodiments, power is cycled responsive to a message transmitted by the one base station to the network interface. Some of these embodiments further comprise optionally reconfiguring the network interface after the power is cycled. In some of these embodiments, the reconfiguring is performed based on the set of rules and the network configuration determined after the power is cycled. In some of these embodiments, the reconfiguring is performed when the network interface is reconnected to the wireless network through a different base station. In some of these embodiments, the reconfiguring is deferred until a signal from one of the one or more base stations has a predetermined minimum strength. In some of these embodiments, the reconfiguring is performed when the network interface is reconnected to the wireless network through a different base station. In some of these embodiments, the loss of communication includes incorrect addressing of data transmitted through the base station.

Furthermore, certain embodiments provide a method for cycling power in a network interface, comprising identifying a disconnection of the network interface from a wireless network, establishing communication between the network interface and one or more base stations of the wireless network, and based on predetermined rules, optionally cycling power to the network interface, wherein the predetermined rules identify network conditions necessitating reconfiguration of the network interface. In some of these embodiments, the cycling power is performed after the establishing communication. In some of these embodiments, the cycling power is performed when the disconnection of the network results from fading of a signal received from a first base station and the communication is established through a second base station. In some of these embodiments, the cycling power is performed based on differences in network configuration of the first and second base stations. In some of these embodiments, the cycling power is deferred for a predetermined time. In some of these embodiments, power is cycled responsive to a message transmitted by the one base station to the network interface. In some of these embodiments, the disconnection is detected based on incorrect addressing of data transmitted through the base station.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method for power cycling in a network interface, comprising:
    establishing communication between a new base station of a wireless network and the network interface, the network interface having a current network address;
    intercepting at the new base station incorrectly addressed data from the network interface, the intercepting occurring after the communication is established between the network interface and the new base station;
    identifying a disconnection of the network interface from an old base station of the wireless network based on the new base station intercepting the incorrectly addressed data from the network interface; and
    transmitting, after the identifying the disconnection, a message from the new base station to the network interface instructing the network interface to cycle power, the power cycling of the network interface comprising powering down the network interface and powering up the network interface, the power cycling of the network interface causing the network interface to request a new network address to replace the current network address, the transmitting being based on a predetermined rule that identifies a network condition for the power cycling, and the network condition including whether a first network configuration of the new base station is different from a second network configuration of the old base station.

2. The method of claim 1, wherein the network condition further includes whether the disconnection of the network interface results from fading of a signal received from the old base station.

3. The method of claim 1, wherein the power cycling is deferred for a predetermined time.

4. A system for power cycling in a network interface, comprising:
   means for establishing communication between a new base station of a wireless network and the network interface, the network interface having a current network address;
   means for intercepting at the new base station incorrectly addressed data from the network interface, the intercepting occurring after the communication is established between the network interface and the new base station;
   means for identifying a disconnection of the network interface from an old base station of the wireless network based on the new base station intercepting the incorrectly addressed data from the network interface; and
   means for transmitting, after the identifying the disconnection, a message from the new base station to the network interface instructing the network interface to cycle power, the power cycling of the network interface comprising powering down the network interface and powering up the network interface, the power cycling of the network interface causing the network interface to request a new network address to replace the current network address, the transmitting being based on a predetermined rule that identifies a network condition for the power cycling, and the network condition including whether a first network configuration of the new base station is different from a second network configuration of the old base station.

5. The method of claim 1, wherein the network condition further includes whether a signal between the network interface and the new base station meets or exceeds a predetermined minimum strength.

6. The method of claim 1, wherein the power cycling is deferred until a signal between a signal between the network interface and the new base station meets or exceeds a predetermined minimum strength.

7. The method of claim 1, wherein the message is a broadcast message.

8. The method of claim 1, wherein the transmitting the message is performed as part of the network interface registering with the new base station.

9. The method of claim 1, wherein a subscriber station comprises the network interface.

10. The method of claim 1, wherein customer premises equipment comprises the network interface.

\* \* \* \* \*